United States Patent [19]

Plante et al.

[11] Patent Number: 4,601,554
[45] Date of Patent: Jul. 22, 1986

[54] VIBRATION ISOLATOR ACTUATOR FOR A SEGMENTED MIRROR

[75] Inventors: Roland L. Plante, Hudson, Mass.; Austin L. McKenney, Amherst, N.H.

[73] Assignee: The United States of America as represented by the Secretary of the Air Force, Washington, D.C.

[21] Appl. No.: 690,438

[22] Filed: Jan. 10, 1985

[51] Int. Cl.$^4$ .............................................. G02B 7/18
[52] U.S. Cl. ..................................... 350/611; 350/637
[58] Field of Search ............... 350/611, 613, 360, 632, 350/637; 343/915

[56] References Cited

U.S. PATENT DOCUMENTS

| 3,154,627 | 10/1964 | Wallis | 350/611 |
| 3,261,016 | 7/1966 | Burr | 350/611 |
| 3,330,958 | 7/1967 | Kaisler et al. | 250/203 |
| 4,402,575 | 9/1983 | Jacobs | 350/486 |
| 4,492,431 | 1/1985 | Eitel et al. | 350/611 |
| 4,500,170 | 2/1985 | Montesanto | 350/611 |

OTHER PUBLICATIONS

"Figure Control for a Fully Segmented Telescope Mirror", T. S. West and J. E. Nelson, J. App. Opt. 21 (14) pp. 2631-2641, (Jul. 15, 1982).

Primary Examiner—Jon W. Henry
Attorney, Agent, or Firm—Donald J. Singer; Bobby D. Scearce

[57] ABSTRACT

A novel actuator for controlling the position of a mirror segment of a segmented mirror assembly and for isolating the segment from vibration is described, which comprises, a movable control member operatively interconnecting the segment and support structure for the mirror assembly; an actuator assembly, which may comprise an electrically controlled magnet and coil, operatively attached to the control member and responsive to an input signal, for moving the control member to selectively position the mirror segment relative to the support structure; a force amplifier connected to one or both ends of the control member for amplifying the force exerted on the control member, and which may be in the form of a pair of cooperating fluid filled bellows of different sizes coaxially disposed at one or both ends of the control member so that compression of the smaller bellows communicating with the larger bellows results in an amplification of the force imposed on the control member; a position sensor for sensing the position of the control member and providing a corresponding output signal; and programmable electronics for processing the output signal of the position sensor and providing the input signal to the actuator according to a preprogrammed scheme.

12 Claims, 1 Drawing Figure

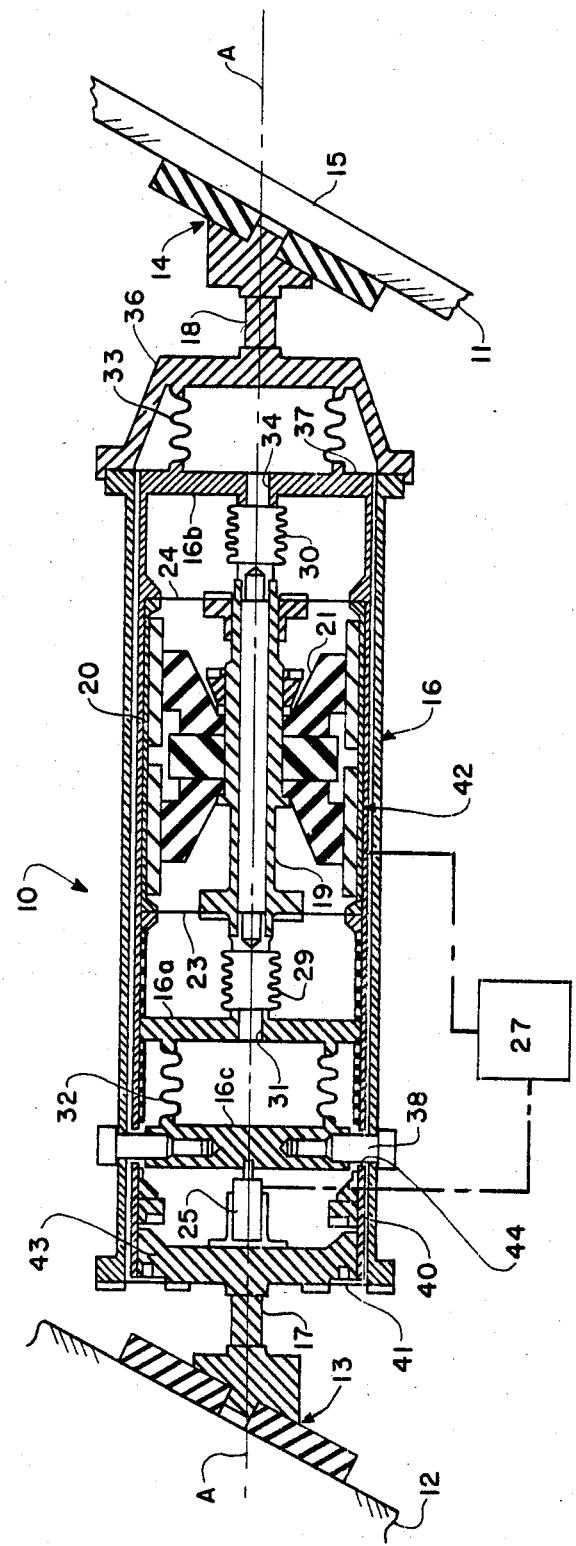

VIBRATION ISOLATOR ACTUATOR FOR A SEGMENTED MIRROR

RIGHTS OF THE GOVERNMENT

The invention described herein may be manufactured and used by or for the Government of the United States for all governmental purposes without the payment of any royalty.

BACKGROUND OF THE INVENTION

The present invention relates generally to improvements in segmented mirror assemblies and controls therefor, and more particularly to a novel actuator for precisely controlling the position of a mirror segment in a segmented mirror assembly and for isolating the segment from vibration.

In segmented mirrors it is essential that adjacent segments be positioned accurately relative to each other so that the mirror has an optically coherent reflective surface of predetermined contour. In addition, vibrations in the structure or bulkhead which supports the segmented mirror must be attenuated to eliminate the associated deleterious effects on optical performance of the mirror.

The present invention provides a novel actuator for precisely controlling the position of a segment in a segmented mirror assembly or the like, and for isolating the segment from vibrations occurring in the supporting structure of the mirror assembly. The novel actuator includes a coil assembly attached to the supporting structure, and a magnet mounted on an axially movable shaft disposed between the segment and supporting structure; a small diameter fluid filled bellows is disposed at each end of the shaft and a larger diameter bellows is disposed between each smaller bellows and the supporting structure or segment to provide push-pull capability. A displacement sensor operatively interconnects the supporting structure and shaft to measure the degree of movement of the shaft. The coil assembly produces a linear axial force on the magnet proportional to the electric current in the coil, which force, acting on and compressing one of the small diameter bellows is amplified by fluid forced from the small bellows into the adjacent larger diameter bellows. The amplified force is applied to the supporting structure, thus displacing the segment relative to the bulkhead, resulting in a corresponding small movement of the segment. This motion compresses the larger diameter bellows at the opposite end of the actuator, moving fluid into the smaller diameter bellows. A 20x amplification of the magnetically induced force may be obtained by suitable sizing of the bellows. Two or mroe phased actuators of the invention may be used for the support of each mirror segment.

It is, therefore, a principal object of the present invention to provide an improved actuator for precisely positioning a segment in a segmented mirror assembly or the like.

It is a further object of the invention to provide an improved segmented mirror assembly.

It is yet another object of the invention to provide an actuator assembly for supporting a segment in a segmented mirror assembly which effectively damps vibrations occurring in the supporting structure of the mirror assembly.

These and other objects of the present invention will become apparent as the detailed description of certain representative embodiments thereof proceeds.

SUMMARY OF THE INVENTION

In accordance with the foregoing principles and objects of the present invention, a novel actuator for controlling the position of a mirror segment of a segmented mirror assembly and for isolating the segment from vibration is described which comprises a movable control member operatively interconnecting the segment and a support structure for the mirror assembly; an actuator assembly, which may be in the form of an electrically controlled magnet and coil, operatively attached to the control member and responsive to an input signal, for moving the control member to selectively position the mirror segment relative to the support structure; a force amplifier connected to one or both ends of the control member for amplifying the force exerted on the control member, and which may be in the form of a pair of cooperating fluid filled bellows of different sizes coaxially disposed at one or both ends of the control member whereby compression of the smaller bellows communicating with the larger bellows results in an amplification of the force imposed on the control member; a position sensor for sensing the position of the control member and providing a corresponding output signal; and programmable electronics for processing the output signal of the position sensor and providing the input signal to the actuator according to a preprogrammed scheme.

DESCRIPTION OF THE DRAWINGS

The present invention will be clearly understood from the following detailed description of representative embodiments thereof read in conjunction with the accompanying drawing which is a view in axial section of a representative embodiment of the actuator.

DETAILED DESCRIPTION

Referring now to the accompanying drawing, shown therein is a schematic axial sectional view of an actuator 10 of the present invention, which may be operable in a push or pull mode, for balancing static compression loads or static tensile loads to which a segmented mirror assembly may be subjected. The embodiment illustrated in the drawing may be viewed as a composite of a plurality of arrangements each of which may comprise an embodiment of the invention, as would occur to one with skill in the field of the invention guided by these teachings.

In accordance with the present invention, actuator 10 may support a movable mirror substrate segment 11 or the like configured to be supported in spaced relationship to a relatively fixed supporting structure or bulkhead 12. Actuator 10 may contact or be otherwise connected to segment 11 and bulkhead 12 at respective ends through contact pads, flexure assemblies, ball joint assemblies or like connectors 13,14 substantially as shown. Segment 11 may be a part of a larger composite segmented mirror assembly, and, accordingly, may support a mirrored surface 15 comprising a portion of a segmented laser mirror, a segmented reflector for an astronomical telescope, or the like. Consequently, it may be desirable to precisely control the position of mirrored surface 15 within the segmented structure of which it is a part, in order to correct for environmentally caused deviations in the surface contour of the segmented structure from a predetermined composite contour, or to provide a variable control over the overall contour of the composite, or to isolate the segmented mirror structure from vibrations in the supporting bulkhead. To this end, one, two, three or other appropriate number of actuators 10 of the present invention may be included in phased relationship to each other for each segment 11.

In the embodiment illustrated in the drawing, actuator 10 comprises a substantially cylindrical outer housing 16 supported at one end at connector 14 through a radially flexible, axially rigid flexure member 18, and at the opposite end by an axially compliant, radially stiff flexure 41 connecting housing 16 to end wall 43 of substantially cylindrical inner housing 42, which is supported at one end at connector 13 through a radially flexible, axially rigid flexure member 17, and at the opposite end by an axially compliant, radially stiff flexure 47 connecting housing 42 to housing 16. Housing 42 supports an actuator shaft 19 operatively disposed along a symmetry axis A via axially compliant, radially stiff flexures 23 and 24. A cylindrical voice coil assembly 20 is disposed on the inner surface of housing 42, and a permanent magnet 21, such as of the samarium-cobalt type, is supported on shaft 19 for axial movement within and relative to coil 20 in response to the application of electrical current through coil 20. In an alternative arrangement, a coil may be disposed on shaft 19 for movement within a cylindrically shaped magnet assembly disposed thereabound on the inner surface of housing 42. The arrangement having magnet 21 on shaft 19 may be preferable in order to dissipate heat from coil 20 into housing 42 rather than into shaft 19. Shaft 19 is disposed within housing 42 between two annularly shaped and axially compliant and radially and torsionally rigid circular flexures 23,24 sized to define a predetermined degree of axial movement permitted of shaft 19 relative to housing 42. The axial flexibility of flexures 23,24 may be chosen to provide a low natural frequency (e.g., 1–5 Hz) to effectively damp vibrations between bulkhead 12 and segment 11. A radial clutch assembly (not shown) may also be included between actuator shaft 19 and housing 42 in order to prevent axial motion of shaft 19. Limit stops such as might be provided by annular ring 40 within housing 42 may be included to limit the degree of deflection attainable for housing 16. Shaft 19 with magnet 21 thereon is therefore restrained to a relatively small degree of axial movement within housing 42 along axis A as suggested in the drawing. In the representative embodiment illustrated in the drawing, the total length of actuator 10 must necessarily correspond to the available space between bulkhead 12 and structure segment(s) 11, although the size of the actuator 10 is not considered limiting of the teachings herein.

A position sensor 25 is disposed near one end of housing 42 in order to detect and measure axial movement of housing 16 relative to housing 42. Accordingly, sensor 25 contacts end wall 16c which is connected to housing 16 through screws 38 passing through elongated holes 44 provided in housing 42 to allow axial movement of housing 42 relative to housing 16. Sensor 25 may be in the form of a linear variable differential transformer (LVDT) or range limit transducer operatively connected to control, information processing and power supply electronics 27. For example, using an LVDT sensor 25, the armature thereof may operatively contact housing 16 at end wall 16c, while the coil assembly thereof is connected for movement with housing 42 at end wall 43 in order to measure relative movement between outer housing 16 and inner housing 42. Sensor 25 provides an output to controller 27 characteristic of the relative positions of housings 42 and 16.

Small diameter, fluid filled bellows 29,30 may be supported at the respective ends of shaft 19 and end walls 16a,16b of housing 42, and may be disposed for expansion or contraction along axis A in response to the corresponding axial movement of actuator shaft 19. Large diameter bellows 32 is connected to end wall 16a of inner housing 42 and to end wall 16c of outer housing 16. Similarly, the belows 33 is connected to end wall 16b of inner housing 42 and to end housing 36 of outer housing 16. The internal volumes of each bellows 32,33 are defined to communicate with respective small bellows 29,30 through axial holes 31,34 provided through end walls 16a,16b. Large bellows 32,33 are each disposed for expansion or contraction along axis A in manner similar to that of small bellows 29,30 and in response to corresponding expansion or contraction of the respective adjacent small bellows 29,30. One or both small bellows and large bellows combinations may be included in order to provide means to amplify the force generated on shaft 19 by the coil 20 and magnet 21 combination, depending on whether a push or push-pull mode for actuator 10 is desired. Large bellows 32,33 preferably have a diameter of from about 1.4 to about 5 times that of bellows 29,30 in order to provide suitable fluid force amplification in the operation of actuator 10 as hereinafter detailed. Large bellows 33 is attached to housing member 36 connected to flexure 18 and connector 14; housing 36 is fastened to outer housing 16 and may be resiliently connected to housing 42 through circular flexure 37 at end wall 16b. Large bellows 32 may be disposed within housing 42 between end wall 16a of inner housing 42 and end wall 16c. Wall element 16c being connected to outer housing 16 by screws 38, and elongated holes 44 in inner housing 42 permitting axial movement of housing 16 relative to housing 42 through flexures 41,37, end wall 16c of housing 16 may therefore be operatively connected to position sensor 25 for movement therewith along axis A in response to the corresponding expansion or contraction of bellows 32. Accordingly, position sensor 25 may be supported on end wall 43 of inner housing 42 which is resiliently connected to housing 16 through circular flexure 41, to provide an output signal, corresponding to the position of wall element 16c relative to end wall 43, to electronics 27.

In the operation of actuator 10 to control the position of a segment 11 relative to bulkhead 12, one or more actuators 10 may be installed in the space between the rear surface of segment 11 and bulkhead 13, with shaft 19 and all flexures in a rest or neutral position such as depicted in the drawing. If segment 11 experiences a force which moves segment 11 from a preselected position, this movement is sensed by sensor 25 which provides an output signal to electronics 27, producing an electric current in coil winding 20. With current applied to the winding of coil 20, a linear force which is proportional to the electric current in the winding of coil 20 is applied to shaft 19 through magnet 21. The force on shaft 19 is amplified by compressing one of the small bellows 29,30, depending on the direction of motion of shaft 19, which forces fluid into the corresponding adjacent large bellows 32,33. Correspondingly, the large bellows at the opposite end is compressed, resulting in movement of fluid into the adjacent small bellows. The magnetic force on shaft 19 may thereby be amplified about 20x, depending on the relative sizes of the large and small bellows and is manifested by movement of end wall 16c relative to bulkhead 12 as measured by sensor 25. The specific amplification may be selected depending on the power requirements and force generating capacity of the coil 20-magnet 21 combination and the weight of segment 11 to be balanced.

The present invention, as hereinabove described, therefore provides a novel actuator for precisely controlling the position of a segment of a segmented mirror assembly or the like, and for isolating the segment from vibrations occurring in the supporting structure of the mirror assembly. It is understood that certain modifications to the invention as described may be made, as might occur to one with skill in the field of this invention, within the scope of the appended claims. Therefore, all embodiments contemplated hereunder which achieve the objectives of the invention have not been shown in complete detail. Other embodiments may be developed without departing from the spirit of the invention or from the scope of the appended claims.

We claim:

1. An actuator for controlling the position of a mirror segment of a segmented mirror assembly, and for isolating said mirror segment from vibration, comprising:
   a. a substantially rigid support;
   b. a movable control member for operative interconnection of said rigid support and said mirror segment;
   c. moving means, responsive to an input signal thereto and operatively connected to said control member, for controllably moving said control member whereby said segment may be selectively positioned relative to said rigid support in response to movement of said control member;
   d. first force amplification means connected to a first end of said control member for amplifying the force exerted on said control member by said moving means; and
   e. position sensing means including a position transducer, operatively connected to said control member, for sensing the position of said control member relative to said rigid support and providing a corresponding output signal.

2. The actuator as recited in claim 1 further comprising second force amplification means operatively connected to a second end of said control member.

3. The actuator as recited in claim 1 wherein said first force amplification means includes first and second fluid filled bellows coaxially disposed between said control member and said mirror segment, and includes first communicating means through which the internal volumes defined by said first and second bellows communicate, one of said first and second bellows having substantially greater internal volume than the other bellows, whereby compression of the smaller bellows acting through said first communicating means on the larger bellows results in an amplification of the force imposed on said control member by said moving means.

4. The actuator as recited in claim 2 wherein said second force amplification means comprises first and second fluid filled bellows coaxially disposed between said control member and said rigid support, and includes communicating means through which the internal volumes defined by said first and second bellows communicate, one of said first and second bellows having substantially greater internal volume than the other bellows, whereby compression of the smaller bellows acting through said communicating means on the larger bellows results in an amplification of the force imposed on said control member by said moving means.

5. The actuator as recited in claim 1 further comprising programmable electronics means, responsive to said output signal, for processing said output signal and providing said input signal to said moving means whereby said control member is controllably positioned according to a preprogrammed scheme applied to said electronics means.

6. The actuator as recited in claim 1 wherein said moving means includes an electrically controlled magnet and coil assembly, one of the magnet and coil operatively attached to said rigid support and the other operatively attached to said control member.

7. A segmented mirror structure comprising:
   a. a plurality of adjacent mirror segments each individually movable and disposed in a predetermined composite arrangement to define a mirrored surface of predetermined contour;
   b. a substantially rigid support;
   c. a movable control member interconnecting said rigid support and one mirror segment of said plurality;
   d. moving means, responsive to an input signal thereto and operatively connected to said control member, for controllably moving said control member whereby said one mirror segment may be selectively positioned relative to said rigid support in response to movement of said control member;
   e. first force amplification means connected to a first end of said control member for amplifying the force exerted on said control member by said moving means; and
   f. position sensing means including a position transducer, operatively connected to said control member, for sensing the position of said control member relative to said rigid support and providing a corresponding output signal.

8. The segmented mirror structure as recited in claim 7 further comprising second force amplification means operatively connected to a second end of said control member.

9. The segmented mirror structure as recited in claim 8 wherein said first force amplification means includes first and second fluid filled bellows coaxially disposed between said control member and said one mirror segment, and includes first communicating means through which the internal volumes defined by said first and second bellows communicate, one of said first and second bellows having substantially greater internal volume than the other bellows, whereby compression of the smaller bellows acting through said first communicating means on the larger bellows results in an amplification of the force imposed on said control member by said moving means.

10. The mirror structure as recited in claim 8 wherein said second force amplification means comprises first and second fluid filled bellows coaxially disposed between said control member and said rigid support, and includes communicating means through which the internal volumes defined by said first and second bellows communicate, one of said first and second bellows having substantially greater internal volume than the other bellows, whereby compression of the smaller bellows acting through said communicating means on the larger bellows results in an amplification of the force imposed on said control member by said moving means.

11. The segmented mirror structure as recited in claim 7 further comprising programmable electronics means, responsive to said output signal, for processing said output signal and providing said input signal to said moving means whereby said control member is controllably positioned according to a preprogrammed scheme applied to said electronics means.

12. The segmented mirror structure as recited in claim 7 wherein said moving means includes an electrically controlled magnet and coil assembly, one of the magnet and coil operatively attached to said rigid support and the other operatively attached to said control member.

* * * * *